US011331985B2

(12) United States Patent
Durfee

(10) Patent No.: US 11,331,985 B2
(45) Date of Patent: May 17, 2022

(54) AUTOMATIC SUN VISOR ASSEMBLY

(71) Applicant: Jason Durfee, Troy, MI (US)

(72) Inventor: Jason Durfee, Troy, MI (US)

(*) Notice: Subject to any disclaimer, the term of this patent is extended or adjusted under 35 U.S.C. 154(b) by 180 days.

(21) Appl. No.: 16/805,722

(22) Filed: Feb. 29, 2020

(65) Prior Publication Data

US 2020/0198447 A1 Jun. 25, 2020

Related U.S. Application Data

(63) Continuation-in-part of application No. PCT/US2018/048877, filed on Aug. 30, 2018.

(60) Provisional application No. 62/551,828, filed on Aug. 30, 2017.

(30) Foreign Application Priority Data

Aug. 30, 2018 (WO) ................ PCT/US2018/048877

(51) Int. Cl.
*B60J 3/02* (2006.01)
(52) U.S. Cl.
CPC ................ *B60J 3/0204* (2013.01); *B60J 3/02* (2013.01)
(58) Field of Classification Search
CPC ............ B60J 11/04; B60J 3/0204; B60J 3/02
USPC ...................................................... 296/97.4
See application file for complete search history.

(56) References Cited

U.S. PATENT DOCUMENTS

| 5,947,544 A | 9/1999 | Hubeshi |
| 6,131,987 A | 10/2000 | Rossiter |
| 6,811,201 B2 | 11/2004 | Naik |
| 7,108,307 B1 | 9/2006 | Sahara et al. |

(Continued)

FOREIGN PATENT DOCUMENTS

KR 20090037874 A * 4/2009

*Primary Examiner* — D Glenn Dayoan
*Assistant Examiner* — Dana D Ivey
(74) *Attorney, Agent, or Firm* — Singh Law Firm PLLC; Gautam Bir Singh

(57) ABSTRACT

An automatic sun visor assembly is disclosed for use in automobiles or in other equipment with windows or windshields. The invention is designed to automatically adjust the position of a visor to provide maximum protection from sunlight and to enhance safety by preventing direct sunlight from interfering with the operator's or the passenger's vision. The invention utilizes motors that include interfaces that allow their control by electronic controllers for automatically adjusting visor's position and orientation based on sensing of environmental conditions such as position of the sun, vehicle orientation and the position of operator's eyes. Specifically, the invention utilizes three motors that enable controlling visor position in three spatial dimensions. The use of an extendable spring wire in the invention enables the visor to stretch out and block direct sunlight from entering at angles where the traditional visors are unable to reach. The visor can also be lowered such as for a short operator or passenger or angled such that it is effective in blocking direct sunlight while also allowing the operator to maintain a clear view of overhead traffic signals. The visor position is controlled by actuators, typically servo-motors, which may be controlled directly by an embedded controller, by a remote control unit in the hands of the operator, or by manually enabling switches included on the visor assembly.

20 Claims, 9 Drawing Sheets

(56) References Cited

U.S. PATENT DOCUMENTS

| | | |
|---|---|---|
| 7,347,479 B2 | 3/2008 | Suzuki et al. |
| 8,162,376 B1 * | 4/2012 | Grossmith ............. B60J 3/0243 |
| | | 296/97.8 |
| 8,392,074 B2 | 3/2013 | Zeng et al. |
| 9,375,997 B2 | 6/2016 | Tamuraya et al. |
| 2016/0368351 A1 | 12/2016 | Levi |

* cited by examiner

AUTOMATIC SUN VISOR ASSEMBLY

CROSS-REFERENCE TO RELATED APPLICATIONS

This application is a Continuation-In-Part of PCT Application PCT/US2018/048877 filed on Aug. 30, 2018, at the US Receiving Office by Inventor Jason Durfee which claims the benefits of U.S. Provisional Patent Application Ser. No. 62/551,828 filed on Aug. 30, 2017, by Inventor Jason Durfee. The above identified patent applications are herein incorporated by reference in their entirety to provide a continuity of disclosure.

TECHNICAL FIELD

This invention relates generally to sun visors for use in an automobile or other equipment with a window or windshield, where the sun visor is automatically positioned to block direct rays of sunlight from interfering with the vision of the operator or the passenger, and the sun visor is automatically repositioned to adapt to changes in environmental conditions, the position or orientation of the vehicle, or the location of the operator's eyes.

BACKGROUND OF THE INVENTION

Automobiles and other equipment containing windows and windshields often feature visors which can be manually adjusted to block sunlight from directly shining into the operator's or passenger's eyes. In order to be effective, manual visors must be positioned to effectively block direct sun rays entering through the vehicle or equipment windshield or window without impairing visibility. As a result, an operator must reposition manual visors continuously as the vehicle or equipment changes direction or orientation. The operator also must manually reposition the visor to account for differing angles of sunlight, such as when the sun changes its position in the sky, or the vehicle or equipment adopts or leaves an inclined position. In some cases, a visor may be ineffective for an operator or passenger with a short height or lower posture. It is also difficult and dangerous to rotate them from the front side while driving. They also block the view of stop lights and traffic signals. In all these situations, the constant need to adjust and reposition a manual sun visor in response to changing environmental and operating conditions can create a distraction that can lead to accidents or can have other safety concerns.

While manual sun visors may be suited for some applications, the safe operation of vehicles and other equipment requires an automatic sun visor system that repositions the visor to optimally shield the operator's eyes from direct sunlight, while minimizing the obstruction of the operator's view. In addition, such an automated system should respond rapidly to environmental and operational changes including: changing position of the sun, changing incline of the vehicle or equipment, change in direction or orientation of vehicle or equipment, changes in operator's or passenger's posture, and changes in the intensity of sunlight entering the window or windshield.

SUMMARY OF THE INVENTION

The present invention is directed to a device that satisfies the present need for an automatic sun visor apparatus to position a visor within the window or windshield frame of the vehicle or other equipment so as to block direct rays entering the window and interfering with the operator's or the passenger's vision, and also minimizing obstructions to the view of the operator. In general, the invention uses a specialized apparatus connected to an electronic control unit common in modern automobiles and other equipment to collect operational and environmental data concerning the sun position and the location and orientation of the vehicle or equipment to optimally position the visor and continually adjust the position in response to changing environmental and operational information.

Embodiments of the invention are depicted in the attached figures. Descriptions cover the presently contemplated mode for carrying out the invention of an automatic sun visor assembly. While the embodiments are presently considered to be practical implementations, it is to be understood that the present invention is not limited to the disclosed embodiments, but on the contrary is capable of implementation in various modifications and equivalent arrangements included within the general description of the invention.

BRIEF DESCRIPTION OF DRAWINGS

The invention will be described in conjunction with the attached drawings in which referenced numerals designate elements, and wherein.

DETAILED DESCRIPTION

Figure 1:
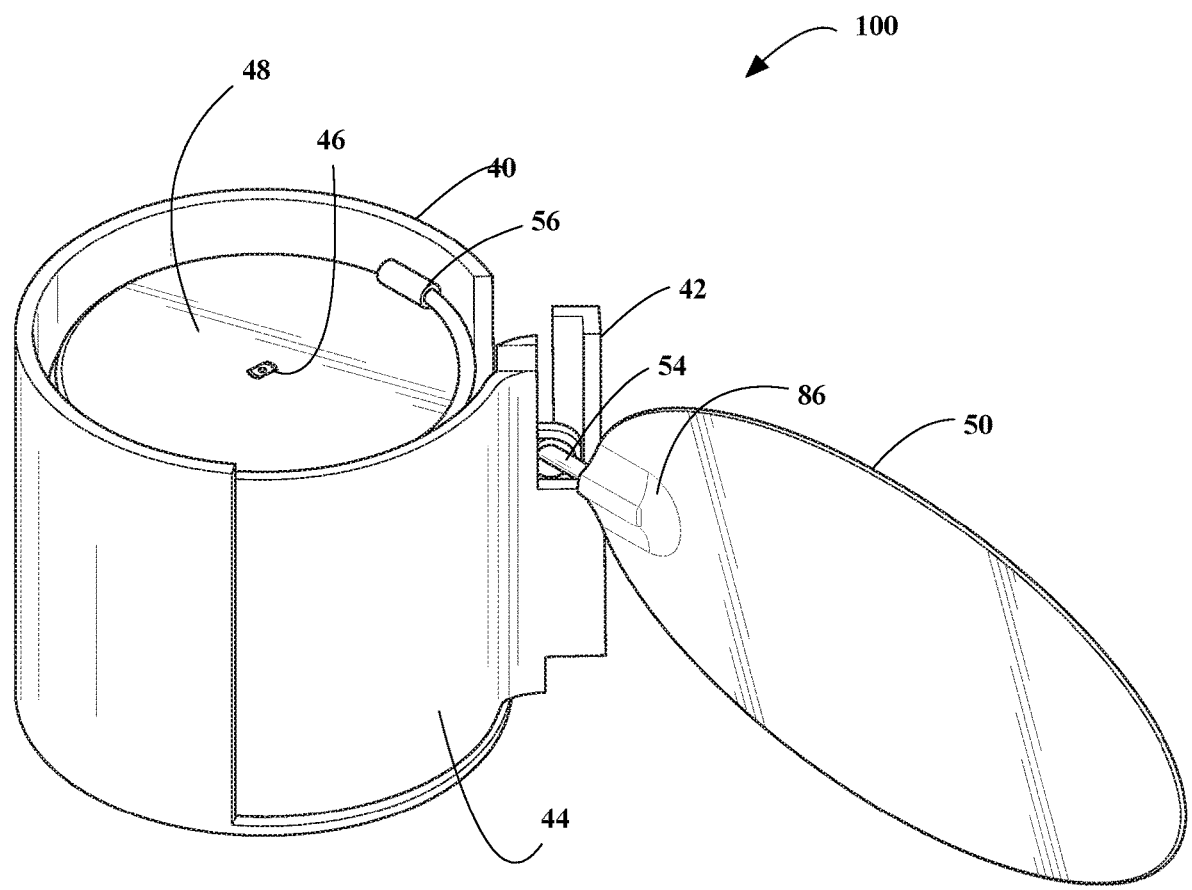
FIG. 1 shows an elevational view of an embodiment of the Automatic Sun Visor Assembly.

FIG. 1 shows an elevational view of an embodiment of the Automatic Sun Visor Assembly 100. The present invention consists of an automatic visor control apparatus, connected to a vehicle or equipment electronic control unit (not shown). The electronic control unit (ECU) should collect data concerning the vehicle or equipment direction and orientation as well as environmental factors such as the direction of the sun, intensity of sunlight, the angle of the sun to the window or windshield, and the location of the operator's eyes. Sensors to collect this data, and ECU modules capable of collecting and transmitting the foregoing data, are all known to person skilled in the art. A system for detection of environmental conditions and the position of the operator is disclosed in U.S. Pat. No. 8,392,074, which is incorporated herein by reference.

FIG. 1 identifies the operating components of one embodiment of the invention. A Sun Visor 50 is sized and shaped to effectively block direct sunlight entering the window or windshield from directly entering the operator's eyes. The Sun Visor 50 should be sized to effectively block sunlight, without obstructing the vision of the operator. The Sun Visor 50 may be oval in shape, or any other shape that provides protection from direct sunlight without obstructing the operators vision. In other embodiments, the Sun Visor 50 may be rectangular, circular, or of any other shape. The Sun Visor 50 may be opaque or, in some embodiments, may be a translucent material chosen to filter out direct sunlight, such as a polarized or photochromic material. The Sun Visor 50 is connected to one end of a Spring Wire 54 or Visor Extender Belt 55 that is in a coiled configuration. The Sun Visor 50 may be connected to the Spring Wire 54 or Visor Extender Belt 55 by any feasible means, including a socket receptacle serving as a Visor Attachment 86. The coil of the Spring Wire 54 or Visor Extender Belt 55 is wound around a Winder 48. The Winder 48 is a generally cylindrical component with a generally circular cross-section. The Winder 48 may have grooves at its periphery to accept the coiled Spring Wire 54.

The Winder 48 and coiled Spring Wire 54 are located within a Housing 40. The Housing 40 should be sized to minimize the space occupied in the area of the operator and may be roughly the size of a soda can (5 inches in height and 2.5 inches in diameter) or smaller. The Housing 40 is designed to attach to the interior of the vehicle or equipment adjacent to the window or windshield. In an automobile, the Housing 40 may be attached to the A-pillar or any other suitable structure near the window or windshield frame. The Winder 48 is housed in a Carriage 44, which in turn is located within the Housing 40. In an embodiment of the invention, the Winder 48 is directly encased within the Housing 40 wherein the Carriage 44, unlike as shown in FIG. 1, does not include a lateral cylindrical surface as shown, but where the Spring Winder Motor 62, Vertical Motor 64, and the Rack Guide 42 are directly attached fixedly to Carriage Floor 45. And where the sub-assembly with Winder 48 and the Spring Wire 54 wound thereupon, Spring Winder Motor 62, Vertical Motor 64, the Rack Guide 42, and the Carriage Floor 45 are all enclosed directly within the Housing 40.

FIG. 1 shows the Sun Visor 50 connected to a Spring Wire 54 capable of being wound where the Spring Wire 54 is directed by passing it through a threading hole serving as a Spring Wire Guide 52. The Spring Wire Guide 52 is a component of the Rack 58 that vertically glides within the Rack Guide 42 that is fixedly attached to Carriage 44, or the Carriage Floor 45 in embodiments where the Carriage 44 does not include a lateral cylindrical surface. Carriage 44 henceforth will refer to both of these embodiments—i.e. an embodiment where the Carriage 44 has a lateral cylindrical surface and a Carriage Floor 45, and an embodiment where the Carriage 44 is simply the Carriage Floor 45. It will be understood by a skilled artisan that where the Carriage 44 is simply the Carriage Floor 45, Spring Winder Motor 62, Vertical Motor 64, and the Rack Guide 42 are all fixedly attached to the Carriage Floor 45. In some embodiments, the Rack Guide 42 is molded to the Carriage Floor 45.

The Carriage 44 enclosed within the Housing 40, has a Winder 48 spinning around a Winder Spindle 63 inserted into the Spindle Opening 46 located along the axis of the Winder 48. In this manner, the clockwise or counterclockwise rotations of the Winder 48 cause the Spring Wire 54 to correspondingly extend or retract out of the Spring Wire Guide 52 thereby bringing about a corresponding movement of the Sun Visor 50. The outward movements of the Spring Wire 54 are limited by inclusion of a Stopper 56 that prevents the Spring Wire 54 from unraveling and falling off the Winder 48.

An embodiment of the automatic sun visor assembly comprises of a spring wire having a first end, a second end, and a length wherein a visor is attached to the second end of the spring wire; a housing fixedly attached to a surface and including a volume wherein the volume further includes a carriage comprising of a winder adapted to wrap or unwrap the spring wire from its first end thereby shortening or unshortening the unwound length of the spring wire, a threading hole adapted to pass the second end of the spring wire therethrough wherein the threading hole is capable of moving in a vertical direction and thereby change an orientation of the spring wire, a rotation mechanism in communication with the housing and the carriage; wherein the rotation mechanism rotates the carriage enclosed within the housing. In an embodiment, the carriage has an inside surface and an outside surface, the winder substantially shaped like a cylinder and including a receptacle disposed along its axis, a winder motor including a spindle where the winder motor is capable of causing a rotational movement in the spindle with the winder motor fixedly attached to the inside surface of the carriage, and the spindle adapted to insert into the receptacle and thereby engage the winder, wherein the spring wire is wrapped or unwrapped over the winder surface upon the winder motor causing rotational movements of the spindle and thereby the winder. In an embodiment, the winder has a top surface, a lateral surface, and a bottom surface, and where the second end of the spring wire and the visor are attached with a visor attachment artifact, and the top surface of the winder includes a retention receptacle adapted to retain the visor attachment artifact when the spring wire is completely wound to the winder. In an embodiment, the winder surface includes grooves to facilitate the winding and unwinding of the spring wire.

Figure 2:
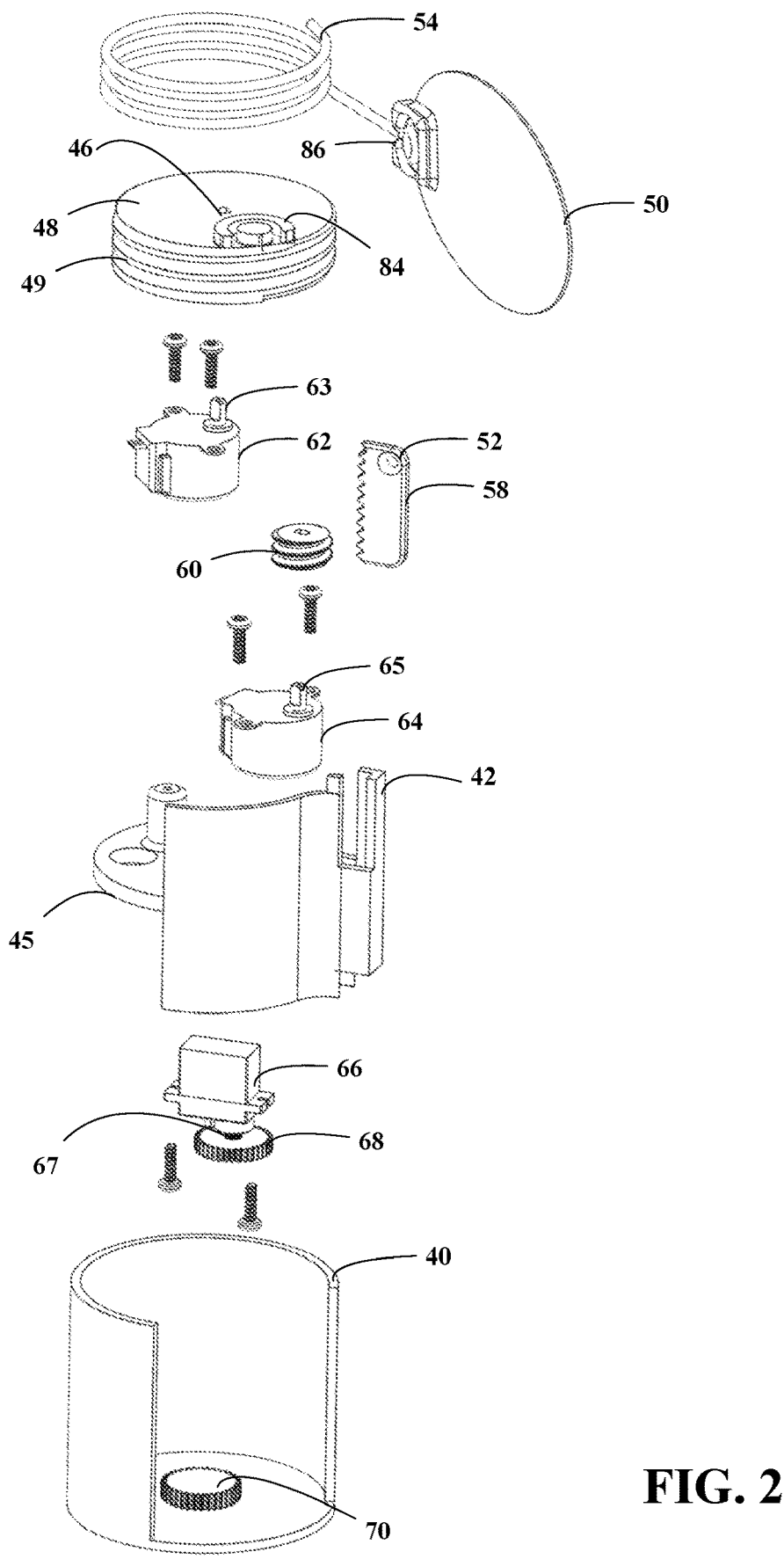
FIG. 2 shows an exploded view of an embodiment of the Automatic Sun Visor Assembly illustrating the packaging of the various internal components.

FIG. 2 shows an exploded view of an embodiment of the Automatic Sun Visor Assembly illustrating the packaging of the various internal components. A control unit for the automatic sun visor apparatus accepts signals from the vehicle or equipment ECU and commands the motors to move the Carriage 44 to an appropriate position based upon environmental and vehicle or equipment operational information. The location of the Winder 48 is controlled by a Spring Winder Motor 62 which is attached to the Carriage 44. In one embodiment, the Spring Winder Motor 62 has a rotating shaft which interlocks with an aperture located in the center of the Winder 48. In one embodiment, the shaft and the aperture are shaped to be engaged in an interlocking manner. The Spring Winder Motor 62 rotates the Winder 48 in response to signals from the vehicle ECU. The location of the Winder 48 results in the Spring Wire 54 being extended or retracted.

Illustrated in FIG. 2 is a Carriage 44 having a Carriage Floor 45 whereupon mounting receptacles are included to fixedly attach a Spring Winder Motor 62 and a Vertical Motor 64 that are mounted thereupon. The Winder 48 incorporates grooves whereupon the Spring Wire 54 is circularly wound. Furthermore, the Winder 48 includes a Spindle Opening 46 adapted to receive a Winder Spindle 63 fixedly attached to a Spring Winder Motor 62. The insertion of the Winder Spindle 63 into the Spindle Opening 46 further engages the Winder 48 such that any rotational movements of the Winder Spindle 63 cause corresponding rotational movements of the Winder 48. Any rotational movements of the Winder 48, in the clockwise or counter-clockwise direction correspondingly cause the Spring Wire 54 to wind or unwind. In this manner, the winding or unwinding of the Spring Wire 54 around the Winder 48 correspondingly causes the Sun Visor 50 to either come closer to or extend farther away from the Housing 40.

The Vertical Motor 64 drives a Pinion 60 which has a plurality of grooves that engage a Rack 58. Correspondingly, as the power gets transferred by the Vertical Motor 64 to its Vertical Spindle 65, it rotates the Pinion 60 which engages it through by winding and unwinding the grooves and correspondingly moving the Rack 58 vertically within the Rack Guide 42. As the Spring Wire 54 is running through the Spring Wire Guide 52 located on top of the Rack 58, the vertical movements of the Rack 58 effectively change the vertical direction towards which the Spring Wire 54 points. The extension or retraction of the Spring Wire 54, and the position of the Rack 58 thus control the position and angle of the Sun Visor 50.

In an embodiment of the invention, the carriage further includes a vertical motor having a pinion spindle attached to a pinion where the vertical motor is capable of causing a rotational movement of the pinion spindle and thereby the pinion, where the vertical motor being fixedly attached to the inside surface of the carriage, and the pinion further adapted to engage a rack where the rack includes the threading hole adapted to receive the spring wire therethrough, and the rotation movements of the pinion cause the rack to move in the vertical direction; a rack guide adapted to receive the rack and allow it to move in the vertical direction within the rack guide, wherein the rack guide is fixedly attached to the inside surface of the carriage; and where the orientation in the vertical direction of the spring wire is adapted to be changed by the rotational movements of the vertical motor and the pinion. In an embodiment of the invention, the vertical motor includes an electronic interface allowing the rotational movements of the vertical motor to be programmatically controlled by a computer program.

In a typical embodiment, the vehicle ECU receives signals from sensors that can include light sensors, occupant head position, compass, and time of day. The ECU uses these input signals to determine an X, Y, and Z location to position the Sun Visor 50. The ECU or visor controller will determine which of the three visor motors to actuate and duration to actuate them to move the sun visor panel to the correct location. In the current invention, the winder motor includes an electronic interface allowing the rotational movements of the winder motor to be programmatically controlled by a computer program.

As illustrated FIG. 2, the Carriage 44 is enclosed within a Housing 40 which is fixedly attached to a vehicle. In an embodiment of the invention, the Housing 40 is attached to the A-Pillar or the driver side post, or the passenger's side post of a vehicle. As illustrated in FIG. 2, a Front/Side Rotator Motor 66 is fixedly attached to the Carriage Floor 45. The Front/Side Rotator Motor 66 is fixedly attached with a Rotator Spindle 67 which is in fixed communication with the Rotator Gear 68. The Rotator Gear Receptor 70 included on the Housing 40 adapted to receive the Rotator Gear 68, is complementary to it and prevents any rotational movements of the gear and thus provides an anchoring point for the Rotator Gear 68. In this manner any torque applied to the Front/Side Rotator Motor 66 brings about a corresponding rotational movements of Rotator Gear 68 pivoted around the Rotator Gear Receptor 70 causing the orientation of the entire Carriage 44 to change. Thus, by engaging the Front/Side Rotator Motor 66 the directional orientation of the Carriage 44 and thereby the position of the Sun Visor 50 can be changed from providing sunlight protection from the windshield to the side window, or vice-versa.

In an embodiment of the invention, the outside surface of the carriage has a rotator motor fixedly attached thereupon, the rotator motor further including a rotator spindle whereupon a gear is fixedly attached; the housing further includes a rotator receptor complementary to and adapted to receive the rotator gear such that upon engaging the rotator gear into the rotator receptacle any relative movements between the rotator receptacle and rotator gear are prevented, and where a rotational movement of the rotator spindle results in a rotational movement of the carriage about the rotator spindle acting as an axis and with the rotator receptor acting as a pivot. In an embodiment, the rotator motor includes an electronic interface allowing the rotational movements of the rotator motor to be programmatically controlled by a computer program.

Figure 3:
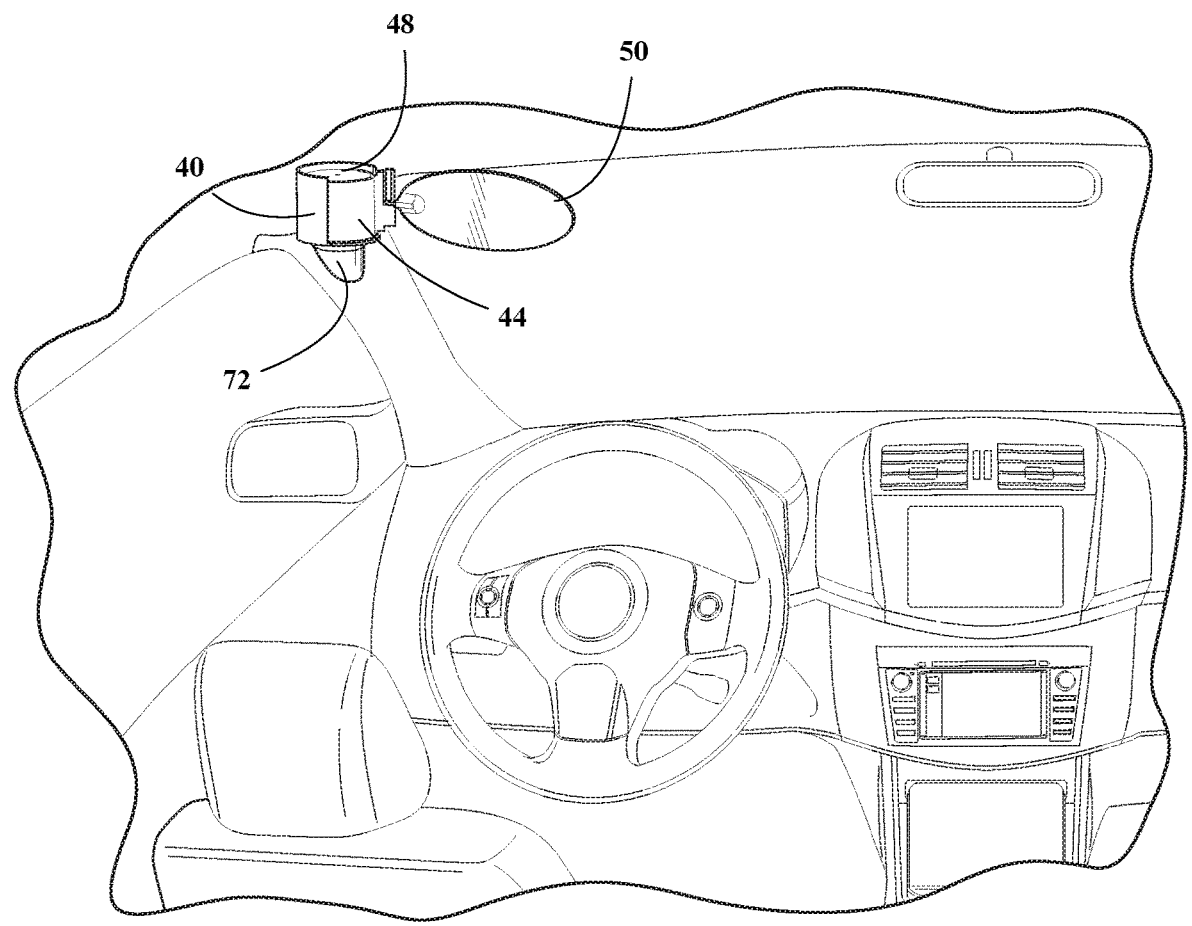
FIG. 3 is an illustration of an environmental view of an embodiment of the Automatic Sun Visor Assembly mounted within a vehicle where the visor is disengaged.

FIG. 3 is an illustration of an environmental view of an embodiment of the Automatic Sun Visor Assembly mounted within a vehicle where the visor is disengaged. In an embodiment of the invention, the Automatic Sun Visor Assembly 100 is fixedly mounted on a Vehicle Mount 72 enabling the invention to be maintained in a desirable orientation. That is the Sun Visor 50 is disposed essentially parallel to the length dimension of the front windshield of a vehicle. The Vehicle Mount 72 is fixedly attached to the A-pillar of a vehicle in the illustrated embodiment. As FIG. 3 depicts, the Automatic Sun Visor Assembly 100 is retracted with the Sun Visor 50 positioned to minimize the obstructed view of the operator. A retracted position would be appropriate if vehicle or equipment was operating at night or at dusk, or if the position of the sun was to the rear of the vehicle or toward the passenger side window of the vehicle.

Figure 4:
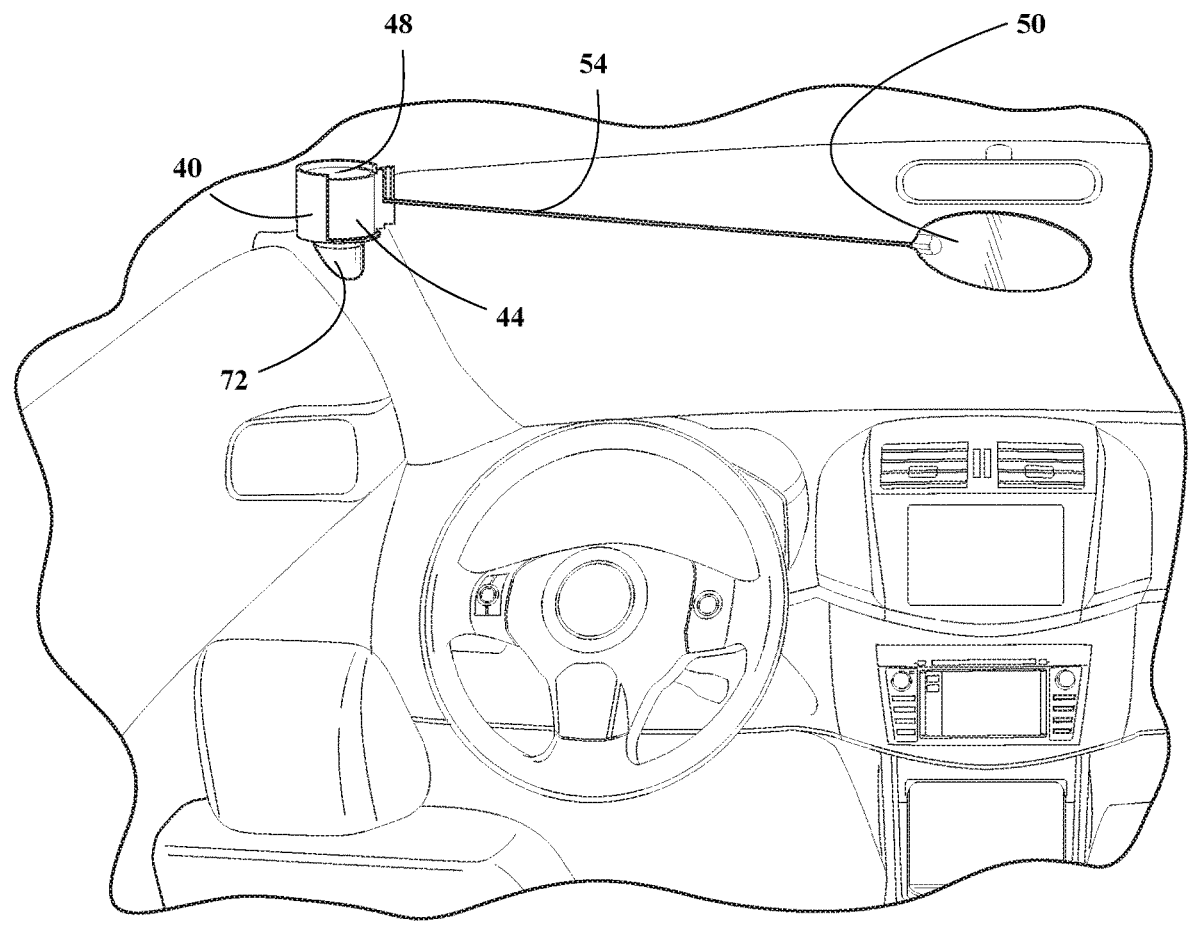
FIG. 4 is an illustration of an environmental view of an embodiment of the Automatic Sun Visor Assembly where the visor is engaged to provide protection from the sun shining through the front windshield of a vehicle.

FIG. 4 is an illustration of an environmental view of an embodiment of the Automatic Sun Visor Assembly where the visor is engaged to provide protection from the sun shining through the front windshield of a vehicle. The movement of the Vertical Motor 64, Front/Side Rotator Motor 66, and Spring Winder Motor 62 can result in the positioning of the visor at a location and angle relative to the window and windshield and the operator's eyes to effectively block direct sunlight entering the window without obstructing the operator's view. FIG. 4 depicts the automatic sun visor assembly of the current invention in an extended position as it would be deployed during normal operating conditions with sunlight entering from the windshield (front) of the vehicle.

Specifically, in this environmental view of FIG. 4, the Spring Winder Motor 62 and the Vertical Motor 64, while Front/Side Rotator Motor 66 is in the normal position. The Vertical Motor 64 is engaged as the Rack 58 has been pulled down causing the Spring Wire Guide 52 to correspondingly orient the Spring Wire 54 to angle downwards. The Spring Winder Motor 62 has been engaged and the Spring Wire 54 also unwound causing the Sun Visor 50 to extend away from the Vehicle Mount 72. In the configuration shown, the Automatic Sun Visor Assembly 100 is able to reach an area of the front windshield which is nearly impossible to be covered by visors currently available on vehicles.

Figure 5:
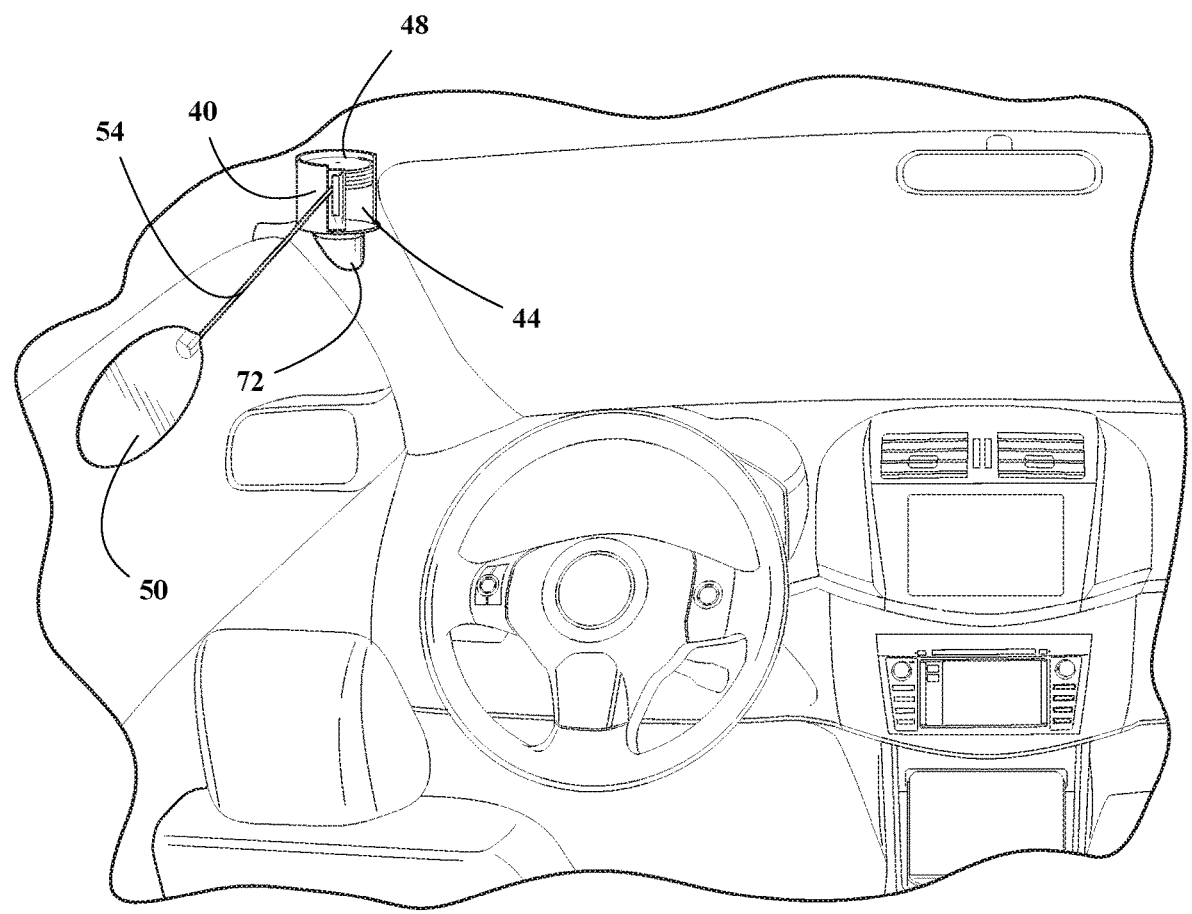
FIG. 5 is an illustration of an environmental view of an embodiment of the Automatic Sun Visor Assembly where the visor is engaged to provide protection from the sun rays coming through the side window.

FIG. 5 is an illustration of an environmental view of an embodiment of the Automatic Sun Visor Assembly where the visor is engaged to provide protection from the sun rays coming through the side window. This figure depicts the Automatic Sun Visor Assembly 100 in an extended-side window position. In this configuration, the Sun Visor 50 is positioned in a location and at an angle to block direct sunlight from entering the vehicle from the operator or passenger side window. In this configuration, the Sun Visor 50 is positioned and angled to optimally block direct sunlight to the operator's eyes from the side but minimize obstruction of their view.

In the environmental view of FIG. 5, the Spring Winder Motor 62, the Vertical Motor 64, and the Front/Side Rotator Motor 66 have all been engaged. The Carriage 44 has been rotated by the Front/Side Rotator Motor 66 within the Housing 40 such that the Sun Visor 50 is protecting the operator from sunlight from coming through the side window. Further, the Rack 58 has been pulled down slightly causing the Spring Wire Guide 52 to correspondingly move down slightly, thereby causing Spring Wire 54 to angle downwards slightly. The Spring Winder Motor 62 has been engaged and the Spring Wire 54 also unwound causing the Sun Visor 50 to extend away from the Vehicle Mount 72.

Figure 6:
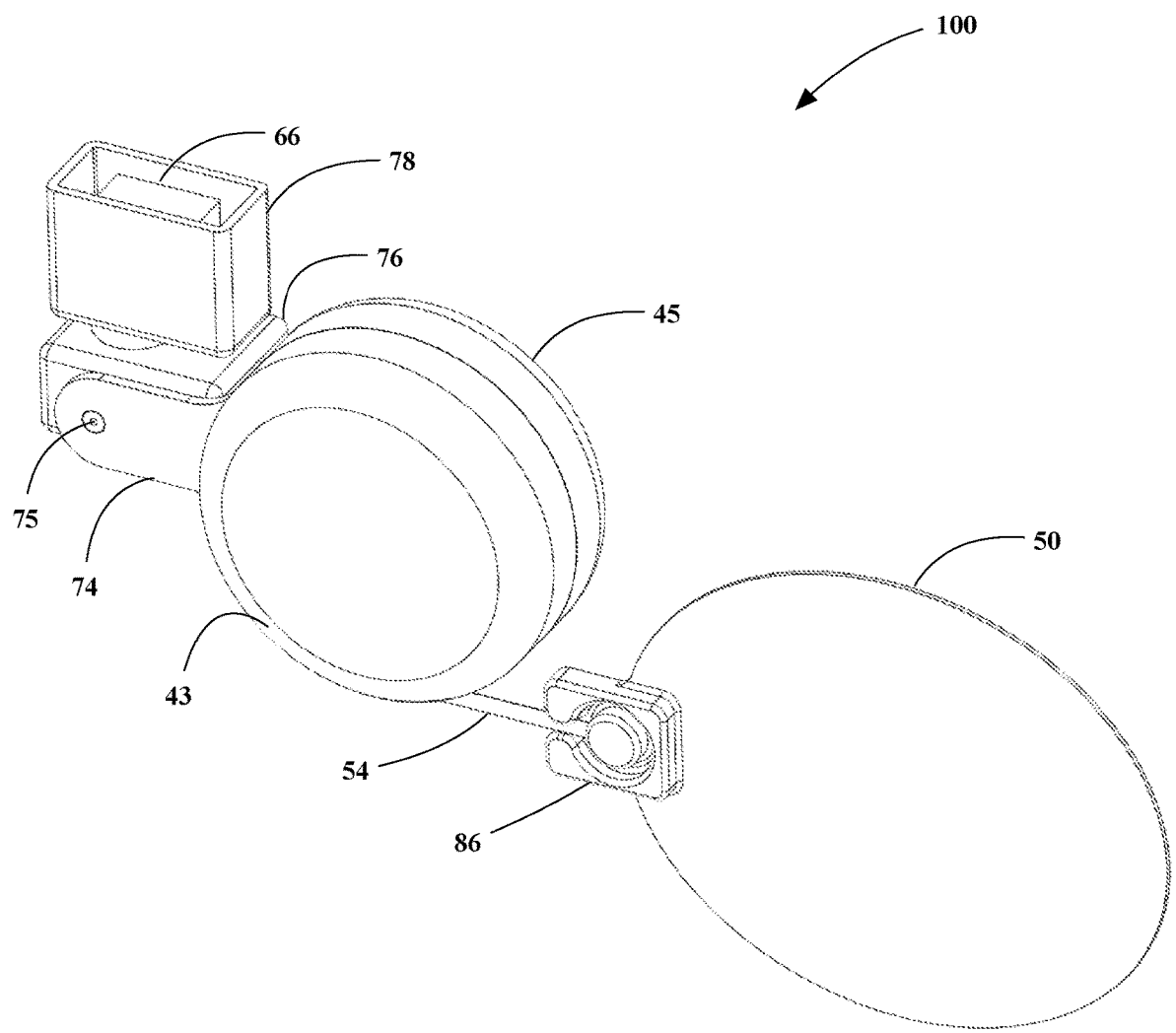
FIG. 6 shows an elevational view of an embodiment of the Automatic Sun Visor Assembly where the Spring Wire Winder is horizontally disposed.

FIG. 6 shows an elevational view of an embodiment of the Automatic Sun Visor Assembly where the Spring Wire Winder is horizontally disposed. In an embodiment of the invention the Winder 48 is disposed such that its axis is horizontal, i.e. parallel to the ground. In an embodiment of the invention, the Winder 48 is included in a Carriage 44 that provides a Flange 74 that is fixedly attached to the spindle of the Vertical Motor 64. In this embodiment of the invention, the Vertical Motor 64 is enclosed in a separate Vertical Motor Housing 76 and fixedly connected to the Flange 74 at the Vertical Motor Receptacle 75 situated thereupon. Thus, any rotational movements of the Vertical Motor 64 effectively rotate the Flange 74 about the Vertical Motor Receptacle 75 acting as a pivot and cause the Carriage 44 to rotate and correspondingly alter the direction of the Spring Wire 54 and that of the Sun Visor 50 attached thereto.

The Front/Side Rotator Motor 66 is enclosed in a Rotator Motor Housing 78 in the embodiment shown in FIG. 6. The Vertical Motor Housing 76 includes a Rotator Motor Receptacle 80 adapted to fixedly attach to the Rotator Spindle 67. The Rotator Motor Housing 78 is fixedly attached to the vehicle, typically at the A-pillar directly or with the help of a Vehicle Mount 72. Rotational movements of the Front/Side Rotator Motor 66 thereby cause the Vertical Motor Housing 76 to rotate and enable the Sun Visor 50 to correspondingly move from the windshield over to the side window or vice versa.

An embodiment of the automatic sun visor assembly comprises of a spring wire having a first end, a second end, and a length wherein a visor is attached to the second end of the spring wire; a carriage with a flange having a point of attachment, the carriage further including a winder connected to a winder rotation device capable of rotational movements and adapted to wrap or unwrap the spring wire from its first end thereby shortening or unshortening the length of the spring wire, a vertical rotation device capable of rotational movements, enclosed in a vertical device housing, and attached to the point of attachment on the flange, where the vertical rotation device is adapted to cause the carriage to rotate in a vertical plane and thereby change the orientation of the spring wire, a lateral rotation device capable of rotational movements, fixedly attached to a surface, and to the vertical device housing where the lateral rotation device is adapted to cause the rotation of the vertical device housing in a horizontal plane and thereby change the orientation of the spring wire.

In an embodiment of the invention, the winder rotation device is a winder motor, and where the carriage has an inside surface and an outside surface where the inside surface encloses a substantially cylindrical volume including the winder substantially shaped like a cylinder and including a winder receptacle disposed along its axis, the winder motor including a winder spindle where the winder motor is capable of causing a rotational movement in the winder spindle with the winder spindle adapted to insert into the winder receptacle and thereby engage the winder, wherein the spring wire is wrapped or unwrapped over the winder surface upon the winder motor causing rotational movements of the spindle and thereby the winder. In an embodiment of the invention, the winder has a top surface, a lateral surface, and a bottom surface, and where the second end of the spring wire and the visor are attached with a visor attachment artifact, and the top surface of the winder includes a retention receptacle adapted to retain the visor attachment artifact when the spring wire is completely wound to the winder.

In an embodiment of the invention the vertical rotation device is a vertical motor and where the vertical motor includes a vertical spindle, the point of attachment on the flange is a vertical spindle receptacle, where inserting the vertical spindle into the vertical spindle receptacle engages the flange, and rotational movements of the vertical motor are adapted to cause a corresponding rotational movement of the vertical spindle and the flange attached thereto.

In an embodiment of the invention the lateral rotation device is a rotator motor and where the rotator motor includes a rotator spindle, the vertical device housing includes a rotator attachment receptacle adapted to receive the rotator spindle, where inserting the rotator spindle into the rotator attachment receptacle engages the vertical housing, and rotational movements of the rotator motor are adapted to cause a corresponding rotational movement of the rotator spindle and the vertical device housing attached thereto.

Figure 7:
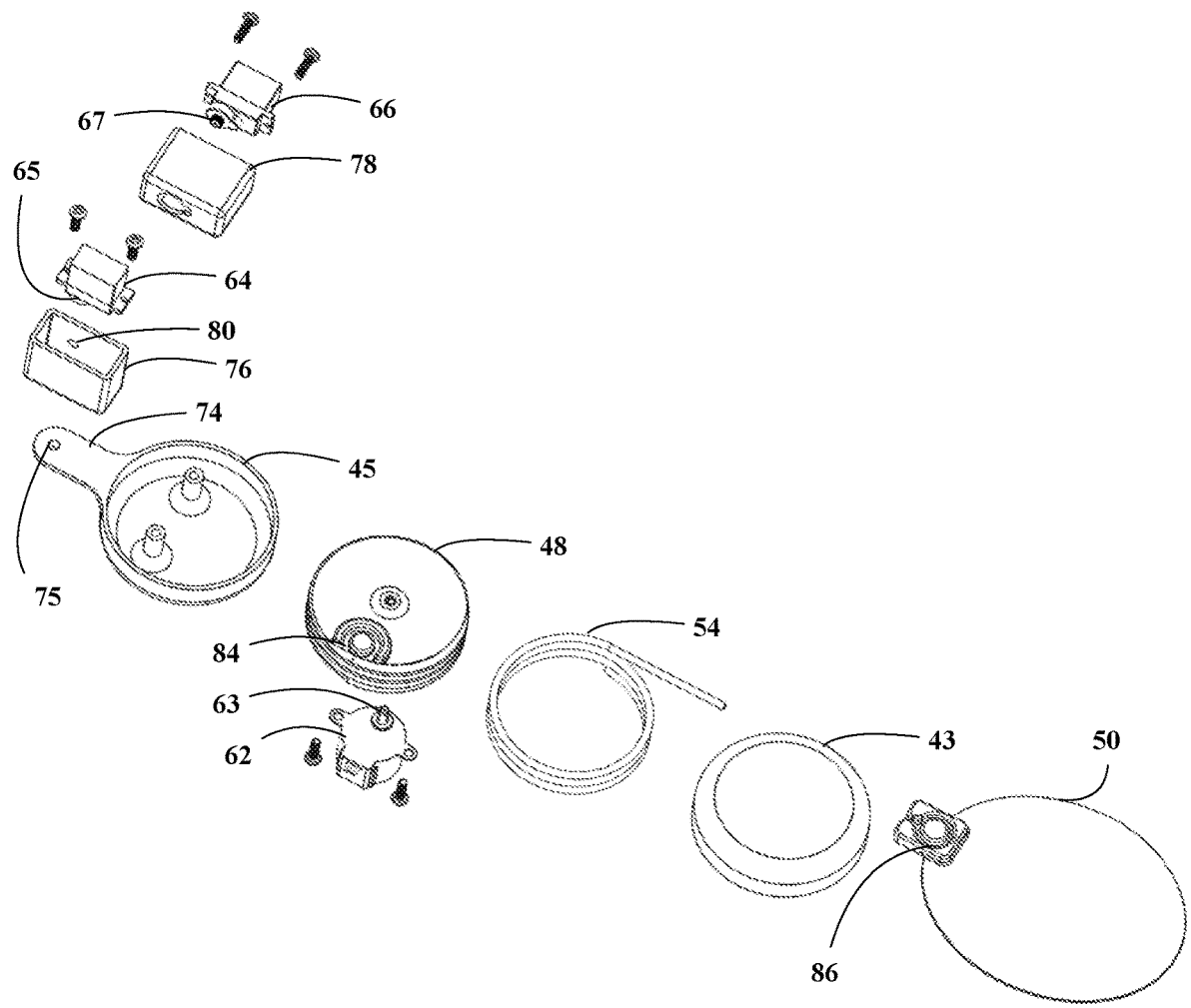
FIG. 7 shows an exploded view illustrating the packaging of the various internal components for the embodiment of the Automatic Sun Visor Assembly with the Spring Wire Winder horizontally disposed.

FIG. 7 shows an exploded view illustrating the packaging of the various internal components for the embodiment of the Automatic Sun Visor Assembly with the Spring Wire Winder horizontally disposed. In the embodiment of the invention shown, the Carriage 44 only includes a single motor, namely, the Spring Winder Motor 62. The Spring Winder Motor 62 is fixedly attached to the Carriage Floor 45 where the Carriage 44 further includes a Flange 74 extending out and away from the carriage and serving as an arm which rotates about the Vertical Motor Receptacle 75 serving as a pivot. The Vertical Motor Receptacle 75 is further adapted to receive and be engaged by the Vertical Spindle 65 which is fixedly attached and in communication with the Vertical Motor 64. In this manner, any torque applied to the Vertical Motor 64 effectively rotates the Carriage 44 in a vertical plane about the Vertical Motor Receptacle 75.

The embodiment of the invention shown in FIG. 7 also includes an attachment artifact Visor Attachment 86 designed to securely attach the Sun Visor 50 to the Spring Wire 54. Furthermore, when the apparatus is disengaged, the Visor Retainer 84 is adapted to be in a substantially complementary to the shape of Visor Attachment 86 and thus securely retains the Sun Visor 50 when disengaged.

Disclosed herein is an automatic sun visor assembly comprising a visor; a visor extender capable of a shortening or a lengthening, a first end, and a second end, wherein the visor is attached to the second end of the visor extender; a carriage having a first receptacle wherein the carriage includes a first rotational device connected to the first end of the visor extender wherein the first rotational device is adapted to cause the shortening and lengthening of the visor extender; a second rotation device having a second receptacle wherein the second rotation device is rotatably connected to the first receptable, and the rotation of the second rotation device is adapted to cause the rotation of the carriage within a first plane; a third rotation device wherein the third rotation device is rotatably connected to the second receptable, and the rotation of the third rotation device is adapted to cause the rotation of the second rotation device within a second plane; and the first plane and the second plane are approximately orthonormal with each other.

In an embodiment of the automatic sun visor assembly, the visor extender is selected from a group consisting of a belt and spring wire. In an embodiment of the automatic sun visor assembly the visor extender is a belt made out of a thermoplastic for an injection or extrusion process, wherein the belt has a profile, and where the profile is tapered, includes ribbing or other elements to increase strength, has a varying thickness and curvature, or is built with lightweight metals.

In an embodiment of the automatic sun visor assembly, the first rotational device includes a motor selected from a group consisting of AC motor, DC motor, stepper motor, servo motor, and linear motor; the second rotational device includes a motor selected from a group consisting of AC motor, DC motor, stepper motor, servo motor, and linear motor; and the third rotational device includes a motor selected from a group consisting of AC motor, DC motor, stepper motor, servo motor, and linear motor.

In an embodiment of the automatic sun visor assembly, the first rotation device includes an electronic interface allowing the rotational movements of the winder rotation device to be programmatically controlled by a computer program; the second rotation device includes an electronic interface allowing the rotational movements of the vertical rotation device to be programmatically controlled by a computer program; and the third rotation device includes an electronic interface allowing the rotational movements of the lateral rotation device to be programmatically controlled by a computer program.

Figure 8:
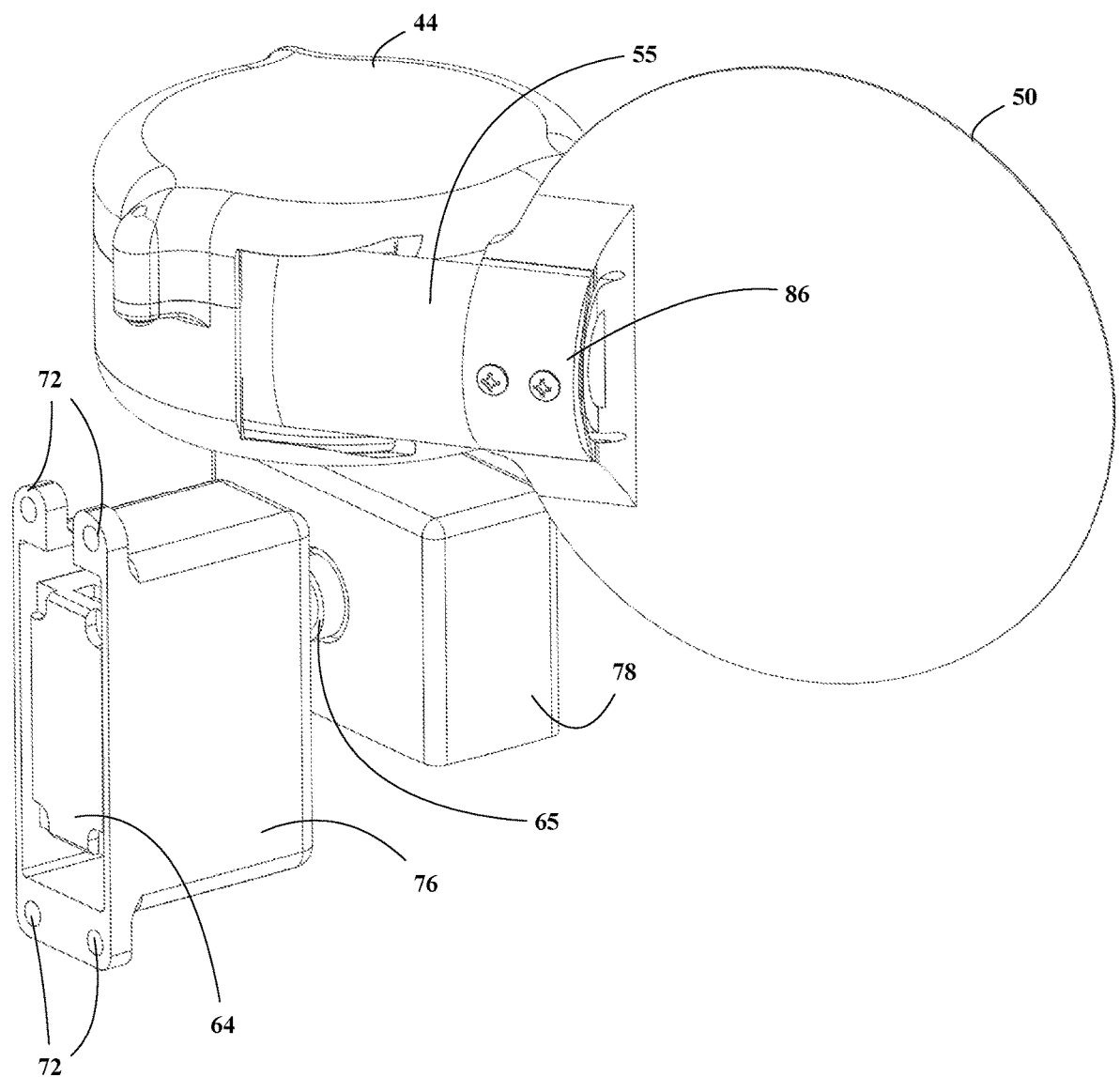
FIG. 8 shows an elevational view of an embodiment of the Automatic Sun Visor Assembly where the visor extender is a belt rather than a spring wire, and the positions of the vertical motor and the rotational motor are switched and the rational motor receptacle is located on the center of the carriage.

FIG. 8 shows an elevational view of an embodiment of the Automatic Sun Visor Assembly where the visor extender is a belt rather than a spring wire, and the positions of the vertical motor and the rotational motor are switched and the rational motor receptacle is located on the center of the carriage. As illustrated, the Vertical Motor Housing 76 includes the Vehicle Mount 72 and the Vertical Motor 64 therein. This Vertical Motor 64 is responsible for tiling the Sun Visor 50 vertically up and down with respect to the horizontal plane defined by the movement of the vehicle. The Vertical Motor 64 accomplishes this by rotating the Rotator Motor Housing 78 that is rotatably attached to the Vertical Spindle 65. The Rotator Motor Housing 78 encloses a Front/Side Rotator Motor 66 therein which includes a Rotator Spindle 67 that is rotatably attached to the Carriage 44. The movements of the Front/Side Rotator Motor 66 are within the horizontal plane within which the vehicle is moving and thus position the Sun Visor 50 from the front windshield to the side window. The Carriage 44 further include the Belt Winder Motor 61 and the Winder 48 responsible for lengthening or shortening of the Visor Extender Belt 55 and thereby adjusting the position of Sun Visor 50 to correspond to the environmental conditions so as to provide maximum protection for the occupant.

The embodiment of the invention shown in FIG. 8 also illustrates the capability of Automatic Sun Visor Assembly 100 for being mounted on a vehicle. While typically, the Automatic Sun Visor Assembly 100 will be mounted on the A-pillar of a vehicle, other mounting locations will be appreciated by a skilled artisan. In the embodiment of the invention shown, the Vehicle Mount 72 are included on the Vertical Motor Housing 76.

Figure 9:
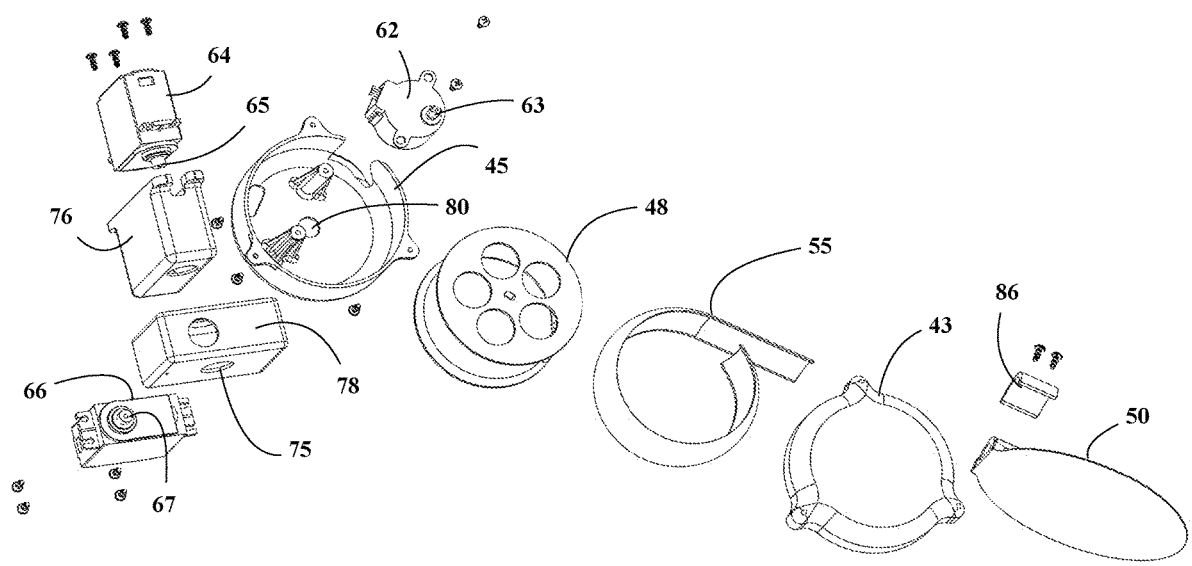
FIG. 9 shows an exploded view illustrating the packaging of the various internal components for the embodiment of the Automatic Sun Visor Assembly with the visor extender being a belt and the rotation receptacle located in the center of the carriage.

FIG. 9 shows an exploded view illustrating the packaging of the various internal components for the embodiment of the Automatic Sun Visor Assembly with the visor extender being a belt and the rotation receptacle located in the center of the carriage. In the embodiment of the invention shown, the Carriage 44 only includes a single motor, namely, the Spring Winder Motor 62. The Spring Winder Motor 62 is fixedly attached to the Carriage Floor 45 where the Carriage 44 further includes a Rotator Motor Receptacle 80 adapted to receive Rotator Spindle 67 and thereby be in rotational communication with the Front/Side Rotator Motor 66 which is housed within a Rotator Motor Housing 78. The rotational movements of the Front/Side Rotator Motor 66 are within the horizontal plane of vehicle's motion and are adapted to rotate the position of Sun Visor 50 from the front windshield to the side window and vice versa. The Rotator Motor Housing 78 further includes a Vertical Motor Receptacle 75 adapted to receive the Vertical Spindle 65 and thereby be in rotational communication with the Vertical Motor 64 which is housed in the Vertical Motor Housing 76. In this manner, any torque applied to the Vertical Motor 64 effectively rotates the Carriage 44 about Vertical Spindle 65 effectively within a plane that is perpendicular to the plane of vehicle's movements. These vertical movements thus tilt the Sun Visor 50 up and down to correspond to the position and occupant and that of the above and below the horizon.

The embodiment of the invention shown in FIG. 9 includes Belt Winder Motor 61 enclosed within the Carriage 44. The Belt Winder Motor 61 includes a Winder Spindle 63 which is rotationally attached to Winder 48 upon which an Visor Extender Belt 55 is wound. While one end of the Visor Extender Belt 55 is wound on the Winder 48, the other end has attached to a Sun Visor 50 which is fixedly attached to the Visor Extender Belt 55 with a Visor Attachment 86. In this manner, the rotational movements Belt Winder Motor 61 cause the Winder 48 to rotate clockwise or counterclockwise and result in the extension or retraction of the Visor Extender Belt 55 resulting in the lateral movements of the Sun Visor 50 attached thereto.

It will be appreciated by a skilled artisan that the Visor Extender Belt 55 can be made out of a thermoplastic for an injection or extrusion process. The profile can be tapered and have additional ribbing or design elements to control and support the visor portion. The design can also vary in thickness and curvature depending on the design requirements. It can also be made of lightweight metals for some applications.

It will also be appreciated by a skilled artisan that the embodiment of the invention shown in FIG. 9 illustrates the use of Winder 48 that is not completely made of solid material but instead incorporates hollow sections running parallel to its axis in order to reduce the overall mass of the Automatic Sun Visor Assembly 100.

In an embodiment of the automatic sun visor assembly the winder rotation device includes an electronic interface allowing the rotational movements of the winder rotation device to be programmatically controlled by a computer program; the vertical rotation device includes an electronic interface allowing the rotational movements of the vertical rotation device to be programmatically controlled by a computer program; and the lateral rotation device includes an electronic interface allowing the rotational movements of the lateral rotation device to be programmatically controlled by a computer program.

It will be appreciated by a skilled artisan that the disclosed invention including three motors allows the movements of the visor portion in the three dimensions.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications, and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. An automatic sun visor assembly comprising:
   a spring wire having a first end, a second end, and a length wherein a visor is attached to the second end of the spring wire;
   a housing fixedly attached to a surface and including a volume wherein the volume further includes a carriage comprising of
      a winder adapted to wrap or unwrap the spring wire from its first end thereby shortening or unshortening the length of the spring wire,
      a threading hole adapted to pass the second end of the spring wire therethrough wherein the threading hole is included in a rack where
         the rack is further configured to glide in a vertical direction and thereby cause a change in the position of the threading hole, and further
         where the change in the position of the threading hole is configured to cause a change in an orientation of the spring wire threaded therethrough,
      a rotation mechanism in communication with the housing and the carriage;
   wherein
   the rotation mechanism rotates the carriage enclosed within the housing.

2. An automatic sun visor assembly of claim 1 wherein:
   the carriage has an inside surface and an outside surface,
      the winder substantially shaped like a cylinder having a winder surface and including a receptacle disposed along its axis,
      a winder motor including a spindle where the winder motor is capable of causing a rotational movement in the spindle with
         the winder motor fixedly attached to the inside surface of the carriage, and
         the spindle adapted to insert into the receptacle and thereby engage the winder,
      wherein the spring wire is wrapped or unwrapped over the winder surface upon the winder motor causing rotational movement of the spindle and thereby the winder.

3. An automatic sun visor assembly of claim 2 wherein the winder has a top surface, a lateral surface, and a bottom surface, and where
   the second end of the spring wire and the visor are attached with a visor attachment artifact, and
   the top surface of the winder includes a retention receptacle adapted to retain the visor attachment artifact when the spring wire is completely wound to the winder.

4. An automatic sun visor assembly of claim 2 where the winder motor includes an electronic interface allowing the rotational movements of the winder motor to be programmatically controlled by a computer program.

5. An automatic sun visor assembly of claim 2 wherein the carriage further includes
   a vertical motor having
      a pinion spindle attached to a pinion where the vertical motor is capable of causing a rotational movement of the pinion spindle and thereby the pinion,
      where
      the vertical motor being fixedly attached to the inside surface of the carriage, and
      the pinion further adapted to engage the rack where
         the rotation movements of the pinion cause the rack to move in the vertical direction;
      a rack guide adapted to receive the rack and allow it to move in the vertical direction within the rack guide, wherein
         the rack guide is fixedly attached to the inside surface of the carriage; and
      where the orientation in the vertical direction of the spring wire is adapted to be changed by the rotational movement of the vertical motor and the pinion.

6. An automatic sun visor assembly of claim 5 where the vertical motor includes an electronic interface allowing the rotational movements of the vertical motor to be programmatically controlled by a computer program.

7. An automatic sun visor assembly of claim 2 wherein
   the outside surface of the carriage has a rotator motor fixedly attached thereupon, the rotator motor further including a rotator spindle whereupon a rotator gear is fixedly attached;
   the housing further includes a rotator receptor complementary to and adapted to receive the rotator gear such that upon engaging the rotator gear into the rotator receptor any relative movements between the rotator receptacle and rotator gear are prevented, and where
   a rotational movement of the rotator spindle results in
      a rotational movement of the carriage about the rotator spindle acting as an axis and with the rotator receptor acting as a pivot.

8. An automatic sun visor assembly of claim 7 where the rotator motor includes an electronic interface allowing the rotational movements of the rotator motor to be programmatically controlled by a computer program.

9. An automatic sun visor assembly of claim 2 where the winder surface includes grooves to facilitate the winding and unwinding of the spring wire.

10. An automatic sun visor assembly comprising:
    a spring wire having a first end, a second end, and a length wherein a visor is attached to the second end of the spring wire;
    a carriage with a flange having a point of attachment, the carriage further including
       a winder connected to a winder rotation device capable of rotational movements and adapted to wrap or unwrap the spring wire from its first end thereby shortening or unshortening the length of the spring wire, the vertical rotation device is adapted to cause the carriage to rotate in a vertical plane and thereby change an orientation of the spring wire, a lateral rotation device capable of rotational movements, fixedly attached to a surface, and to the vertical device housing where the lateral rotation device is adapted to cause the rotation of the vertical device housing in a horizontal plane and thereby change the orientation of the spring wire.

11. An automatic sun visor assembly of claim 10 where the winder rotation device is a winder motor, and where the carriage has an inside surface and an outside surface where the inside surface encloses a substantially cylindrical volume including the winder substantially shaped like a cylinder and including a winder receptacle disposed along its axis, the winder motor including a winder spindle where the winder motor is capable of causing a rotational movement in the winder spindle with the winder spindle adapted to insert into the winder receptacle and thereby engage the winder, wherein the spring wire is wrapped or unwrapped over the winder surface upon the winder motor causing rotational movements of the winder spindle and thereby the winder.

12. An automatic sun visor assembly of claim 11 wherein the winder has a top surface, a lateral surface, and a bottom surface, and where the second end of the spring wire and the visor are attached with a visor attachment artifact, and the top surface of the winder includes a retention receptacle adapted to retain the visor attachment artifact when the spring wire is completely wound to the winder.

13. An automatic sun visor assembly of claim 10 where the vertical rotation device is a vertical motor and where the vertical motor includes a vertical spindle, the point of attachment on the flange is a vertical spindle receptacle, where inserting the vertical spindle into the vertical spindle receptacle engages the flange, and rotational movements of the vertical motor are adapted to cause a corresponding rotational movement of the vertical spindle and the flange attached thereto.

14. An automatic sun visor assembly of claim 10 where the lateral rotation device is a rotator motor and where the rotator motor includes a rotator spindle, the vertical device housing includes a rotator attachment receptacle adapted to receive the rotator spindle, where inserting the rotator spindle into the rotator attachment receptacle engages the vertical device housing, and rotational movements of the rotator motor are adapted to cause a corresponding rotational movement of the rotator spindle and the vertical device housing attached thereto.

15. An automatic sun visor assembly of claim 10 where the winder rotation device includes an electronic interface allowing the rotational movements of the winder rotation device to be programmatically controlled by a computer program;

the vertical rotation device includes an electronic interface allowing the rotational movements of the vertical rotation device to be programmatically controlled by a computer program; and the lateral rotation device includes an electronic interface allowing the rotational movements of the lateral rotation device to be programmatically controlled by a computer program.

16. An automatic sun visor assembly comprising a visor;

a visor extender capable of a shortening or a lengthening, a first end, and a second end, wherein the visor is attached to the second end of the visor extender;

a carriage having a first receptacle wherein the carriage includes a first rotational device connected to the first end of the visor extender wherein the first rotational device is adapted to cause the shortening and lengthening of the visor extender;

a second rotation device having a second receptacle wherein the second rotation device is rotatably connected to the first receptacle, and the rotation of the second rotation device is adapted to cause the rotation of the carriage within a first plane;

a third rotation device wherein the third rotation device is rotatably connected to the second receptacle, and the rotation of the third rotation device is adapted to cause the rotation of the second rotation device within a second plane; and the first plane and the second plane are approximately orthonormal with each other.

17. An automatic sun visor assembly of claim 16 where the visor extender is selected from a group consisting of a belt and spring wire.

18. An automatic sun visor assembly of claim 16 where the visor extender is a belt made out of a thermoplastic for an injection or extrusion process, wherein the belt has a profile, and where the profile is tapered, includes ribbing or other elements to increase strength, has a varying thickness and curvature, or is built with lightweight metals.

19. An automatic sun visor assembly of claim 16 where the first rotational device includes a motor selected from a group consisting of AC motor, DC motor, stepper motor, servo motor, and linear motor;

the second rotational device includes a motor selected from a group consisting of AC motor, DC motor, stepper motor, servo motor, and linear motor; and the third rotational device includes a motor selected from a group consisting of AC motor, DC motor, stepper motor, servo motor, and linear motor.

20. An automatic sun visor assembly of claim 16 where the first rotation device includes an electronic interface allowing the rotational movements of the winder rotation device to be programmatically controlled by a computer program;

the second rotation device includes an electronic interface allowing the rotational movements of the vertical rotation device to be programmatically controlled by a computer program; and the third rotation device includes an electronic interface allowing the rotational movements of the lateral rotation device to be programmatically controlled by a computer program.

* * * * *